United States Patent
Wattyn

(10) Patent No.: US 10,814,547 B2
(45) Date of Patent: Oct. 27, 2020

(54) STEREOLITHOGRAPHY METHOD AND APPARATUS, AND HOLDER FOR USE IN SUCH A METHOD

(71) Applicant: Xeikon Prepress N.V., Ypres (BE)

(72) Inventor: Bart Mark Luc Wattyn, Dentergem (BE)

(73) Assignee: Xeikon Prepress N.V., Ypres (BE)

( * ) Notice: Subject to any disclaimer, the term of this patent is extended or adjusted under 35 U.S.C. 154(b) by 387 days.

(21) Appl. No.: 15/521,459

(22) PCT Filed: Oct. 21, 2015

(86) PCT No.: PCT/EP2015/074301
§ 371 (c)(1),
(2) Date: Apr. 24, 2017

(87) PCT Pub. No.: WO2016/062739
PCT Pub. Date: Apr. 28, 2016

(65) Prior Publication Data
US 2017/0326787 A1    Nov. 16, 2017

(30) Foreign Application Priority Data

Oct. 24, 2014  (NL) .................................... 2013681
Feb. 5, 2015   (NL) .................................... 2014237

(51) Int. Cl.
*B29C 64/135* (2017.01)
*B29C 64/124* (2017.01)
*B33Y 10/00* (2015.01)
*B29C 64/35* (2017.01)
(Continued)

(52) U.S. Cl.
CPC .......... *B29C 64/135* (2017.08); *B29C 64/124* (2017.08); *B33Y 10/00* (2014.12); *B33Y 30/00* (2014.12); *B29C 64/321* (2017.08)

(58) Field of Classification Search
CPC ... B29C 64/124; B29C 64/135; B29C 64/321; B33Y 10/00
See application file for complete search history.

(56) References Cited

U.S. PATENT DOCUMENTS 4,575,330 A    3/1986  Hull
5,009,585 A *  4/1991  Hirano .................. B29C 64/135
                                                118/500
(Continued)

FOREIGN PATENT DOCUMENTS

DE    102012011610 A1    11/2012
EP      0436760 A1        7/1991
(Continued)

*Primary Examiner* — Philip C Tucker
*Assistant Examiner* — Jimmy R Smith, Jr.
(74) *Attorney, Agent, or Firm* — The Webb Law Firm

(57) ABSTRACT

A method for stereolithography printing, including the steps of positioning a holder containing a printing material in a first position in a stereolithography apparatus; stereolithography printing a plurality of successive layers in said holder using radiation for solidifying the printing material, such that one or more objects are formed; moving said holder from said first position to a second position away from said first position; opening said holder and removing said one or more objects from said opened holder, in said second position of the holder.

15 Claims, 11 Drawing Sheets

(51) Int. Cl.
_B33Y 30/00_   (2015.01)
_B29C 64/321_   (2017.01)

(56)         References Cited

U.S. PATENT DOCUMENTS

| | | | |
|---|---|---|---|
| 2009/0196946 A1* | 8/2009 | Kihara | B33Y 30/00 |
| | | | 425/171 |
| 2010/0193998 A1* | 8/2010 | Crump | C23C 26/02 |
| | | | 264/401 |
| 2014/0131908 A1* | 5/2014 | Sun | A61K 6/083 |
| | | | 264/16 |
| 2015/0056320 A1 | 2/2015 | Costabeber | |
| 2017/0246797 A1* | 8/2017 | Lambrecht | B29C 64/307 |

FOREIGN PATENT DOCUMENTS

| | | | |
|---|---|---|---|
| EP | 2537665 A1 | 12/2012 | |
| WO | 2014016668 A1 | 1/2014 | |

\* cited by examiner

STEREOLITHOGRAPHY METHOD AND APPARATUS, AND HOLDER FOR USE IN SUCH A METHOD

CROSS-REFERENCE TO RELATED APPLICATIONS

This application is the United States national phase of International Application No. PCT/EP2015/074301 filed Oct. 21, 2015, and claims priority to Dutch Patent Application Nos. 2013681 and 2014237, filed Oct. 24, 2014 and Feb. 5, 2015, respectively, the disclosures of which are hereby incorporated in their entirety by reference.

FIELD OF INVENTION

The field of the invention relates to stereolithography and more in particular to stereolithography methods and apparatus for manufacturing objects and to a holder or cartridge for storing a printing or building material, typically a liquid, for use in such methods and apparatus.

BACKGROUND

Stereolithography apparatus, also referred to as SLAs, and stereolithography methods have been available for a long time. An example of a stereolithography apparatus and method is disclosed in U.S. Pat. No. 4,575,330 filed in 1984. Stereolithography is a method for building parts by successively "printing" layers of a solidified fluid-like building material on top of each other. The building or printing material may be, for example, a liquid photocurable polymer which is solidifiable upon exposure to UV radiation or the like. Powder materials may also be used. In prior art systems an ultraviolet laser in combination with a reflecting mirror arrangement, e.g. a digital mirror device (DMD), is used to expose a surface. After the surface is exposed by the laser, an elevator raises or lowers (depending on whether a top or bottom mounted exposure unit is being used) the object that is being formed, allowing another layer of fresh material to cover the surface of the object for formation of the next layer.

Many stereolithography apparatus have the disadvantage that they require the container to be cleaned and refilled regularly, which involves a lot of maintenance.

WO2014/016668 tries to address this problem and discloses a cartridge for a stereolithography apparatus. The cartridge comprises a container with an access opening; a reservoir for containing the building material, said reservoir being permanently associated with the container; feeding means to feed the building material from the reservoir towards the container. The bottom of the container is at least partially transparent to said radiation that is being used for solidifying the building material, and is situated opposite the access opening of the container. In that manner, the container does not need to be topped up by an operator, at least until the building material in the reservoir has completely run out, and no automatic feeding devices have to be installed in the apparatus.

Although the system with a cartridge of WO2014/016668 has certain advantages compared to other prior art systems, there is a risk that the feeding means in the cartridge do not function properly, in which case the entire cartridge needs to be replaced. Further, when on object needs to be printed with a different printing material, the cartridge has to be removed and another cartridge with another printing material has to be inserted. Also, the cartridge is complex, and any accessories that were previously required in the container, now need to be provided in the cartridge.

SUMMARY

An object of embodiments of the invention is to provide a stereolithography method and apparatus for which the process that needs to be performed by an operator is simplified, in particular reducing or avoiding cleaning operations between consecutive print jobs. Another object of embodiments of the invention is to provide a holder for storing a printing or building material, typically a liquid, for use in such methods and apparatus.

According to a first aspect of the invention there is provided a method for stereolithography printing of one or more objects. The method comprises the steps of: positioning a holder containing a printing material in a first position in a stereolithography apparatus; stereolithography printing a plurality of successive layers in said holder using radiation for solidifying the printing material, such that one or more objects are formed; moving said holder from said first position to a second position away from said first position; opening said holder and removing said one or more objects from said opened holder, in said second position of the holder.

Embodiments are based inter alia on the inventive insight that stereolithography printing may be performed in a holder between two walls of the holder, wherein an amount of printing material is provided which is sufficient for one print job. By using a holder which is typically intended for printing only one print job (one object or a plurality of objects which are printed during the same print job), the printing may be performed in a clean manner, whereupon the printed object may be removed from the holder, after the holder has been removed from the first position in the stereolithography printing machine to a second position where avoiding contamination with printing material is not critical. In that way any soiling of any critical parts of the stereolithography printing apparatus with printing material can be avoided.

In a preferred embodiment the holder is configured for allowing a first wall inner surface and a second wall inner surface of the holder to be moved towards each other and away from each other, and wherein stereolithography printing a plurality of successive layers comprises: advancing said second wall inner surface and first wall inner surface towards each other for creating a layer to be printed between said first wall and said second wall; printing said layer; and moving said second wall inner surface away from the first wall inner surface whereby fresh printing material flows in between the first wall and the second wall.

According to a possible embodiment, during said advancing and during said moving away, the shape of the holder is changed for creating a fresh layer of printing material between the first wall inner surface and the second wall inner surface of the holder.

According to an exemplary embodiment, the holder has a first wall, a second wall opposite said first wall, and a sleeve extending between said first and second wall. Preferably, the stereolithography printing comprises advancing said second wall and first wall towards each other for creating a layer to be printed between said first and second wall, and moving away said second wall from said first wall for allowing fresh printing material to flow between said first and second wall, wherein, during said advancing and during said moving away, the shape of the sleeve changes.

According to an exemplary embodiment the holder comprises a housing with a first wall and a second wall opposite said first wall, said second wall and/or said first wall being moveably arranged in said housing, such that said first wall can be advanced to and moved away from said second wall, wherein stereolithography printing a plurality of successive layers comprises: advancing said second wall and first wall towards each other for creating a layer to be printed between said first wall and said second wall; printing said layer; and moving said second wall away from the first wall whereby fresh printing material flows in between the first wall and the second wall.

In a preferred embodiment the stereolithography printing is performed in the first position in the stereolithography printing apparatus, and the method further comprises, before the opening of the holder with the one or more printed objects, removing said holder with the one or more printed objects from said stereolithography apparatus to the second position outside of the stereolithography apparatus. In that way any contamination of the stereolithography apparatus can be reduced or avoided. Alternatively, the printing may take place in a printing module of the stereolithography printing apparatus, the opening and removing of the one or more objects may take place in a second position in an object removal module of the stereolithography printing apparatus.

In a possible embodiment, the holder may be disposed of after the removal of the one or more printed objects from the holder. In an alternative embodiment, the holder may be provided with an opening mechanism that can be opened and closed, such as a zip, for allowing on the one hand the removal of the one or more objects and on the other hand the refilling of the holder. Such a refilling may be done manually or may take place in a separate filling module, see further.

Preferably the holder comprises a window, and the stereolithography printing comprises sending radiation through said window to solidify a layer of printing material adjacent said window. In a preferred embodiment the window is provided in the first wall.

Preferably, the holder comprises a modeling surface, and wherein during the stereolithography printing a layer of solidified material adheres to said modeling surface. Preferably, the modeling surface is provided on the second wall inner surface.

In an exemplary embodiment, the holder is filled with an amount of printing material, said amount being more than an amount needed for printing one print job but less than an amount needed for printing two print jobs. Embodiments of the invention may be used for printing various objects, but are particularly useful for printing an object with a size which is more or less known, such as a dental arch. For printing a dental arch the dimensions and shape of the holder may be as follows: a sleeve with a more or less square cross section with an edge length between 70 and 100 mm, and with a height between 15 and 30 mm.

According to another aspect, there is provided a method comprising: determining an amount of printing material needed to print a plurality of successive layers to create one or more objects in a holder; and filling the holder with said determined amount of printing material. Preferably, the holder will be filled whilst open, whereupon the holder is closed. Preferably, the filling takes place outside of the stereolithography apparatus. If the holder is bag-like the closing may comprise sealing the bag. If the holder comprises a house with a moveable first and/or second wall, the opening/closing of the holder may comprise removing the first or second wall. Optionally, before closing the holder, the holder may also be filled with a predetermined amount of gas. Optionally, the determining of the amount of printing material and/or the amount of gas is based on a three dimensional computer model of the one or more objects to be printed during the same print job. In that way holders for 3D printing may be prepared with a suitable amount of printing material.

In a preferred embodiment, the one or more objects comprise any one of the following: a tooth, a plurality of teeth, a lower or upper dental arch, a removable die, a bridge. This list is not limiting, and a skilled person understands that many other types of objects can be built using embodiments of the method of the invention.

According to a second aspect of the invention, there is provided a holder containing a printing material for use in stereolithography printing using radiation for solidifying said printing material. The holder has a first wall, and a second wall opposite said first wall. The first wall comprises a first portion which is configured for allowing the radiation to pass through. The second wall has an internal surface portion which is configured to adhere to the printing material upon solidification thereof. The holder is configured for allowing the second wall to be approached to the first wall such that a layer of printing material can be printed between said first and second wall.

In a preferred embodiment the holder further comprises a sleeve extending between the first wall and the second wall, wherein the sleeve is configured for allowing the second wall to be approached to and moved away from said first wall such that a layer of printing material can be printed between said second and first wall.

Preferably, the sleeve is configured for allowing the printing material in the holder to move outwardly as the second wall is approached to the first wall, and inwardly as the second wall is moved away from said first wall. The sleeve may be flexible, and/or compressible, and/or stretchable, and/or deformable. In a typical embodiment, the sleeve may be made of a "plastic bag" material or of a "balloon" material. However, also "paper bag" materials may be suitable. In yet another embodiment, the sleeve could be a compressible accordion sleeve. The sleeve and liquid level in the holder are such that the second wall can be moved parallel to the first wall, and at a small distance thereof, e.g. a distance smaller than 2 mm.

In a preferred embodiment the sleeve is made of a film or sheet material. Such a material can easily adopt its shape according to the movement of the second wall with respect to the first wall.

In a possible embodiment the first wall comprises a transparent film or sheet material. The first wall may then further comprise a frame, wherein the film or sheet material of the first wall is fixed to the frame. When both the sleeve and the first wall are made of a film or sheet material they may be shaped as a bag.

In a possible embodiment, the sleeve is made of a single or multilayer film material comprising any one or more of the following: a plastic layer, a metal layer.

According to another exemplary embodiment the holder comprises a house with a first wall and a second wall opposite said first wall, said second wall and/or said first wall being moveably arranged in said housing, such that said first wall can be advanced to and moved away from said second wall. The first wall comprises a first portion which is configured for allowing the radiation to pass through. The second wall has an internal surface portion which is configured to adhere to the printing material upon solidification thereof. In a possible embodiment the house comprises a wall with a channel which is arranged for guiding said second wall and/or first wall.

In an exemplary embodiment the house may comprise a cup and a cover, wherein the first wall is a bottom wall of the cup, and wherein the second wall is coupled in such a manner with the cover that the second wall can be advanced to and moved away from the first wall. The second wall may be e.g. fixed to an end of a guide rod, wherein the guide rod extends through a hole in the cover, such that said second wall can be moved with respect to said first wall by moving said guide rod. In another embodiment the second wall may be mounted in the cover via a compressible or flexible sleeve, optionally a stretchable sleeve, such that the second wall can be advanced to the first wall whilst the sleeve is stretched or straightened.

Preferably, the first portion of the first wall is covered at an inner surface thereof with a coating configured for promoting the detaching from solidified printing material. The coating may be e.g. a silicone coating.

Preferably, the printing material is a liquid or a paste, e.g. a liquid photocurable polymer which is solidifiable upon exposure to UV radiation or the like. Alternatively, the printing material may be a powder material, which forms a solidified mass when sintered by radiated heat from a heated element or source of IR radiation or the like. In a possible embodiment, the holder further comprises a spring means acting between the second wall and the first wall for keeping said second wall at a distance of said first wall when the spring means are in a non-compressed state. In that way, when the one or more objects are removed from the holder, they will not be in the remaining printing material.

In a preferred embodiment, the first wall comprises a first plate which is transparent to the radiation used, such as a glass plate. Typically UV radiation is used.

In a preferred embodiment, the second wall comprises a second plate made of a material that adheres to solidified printing material. The second plate may be e.g. a metal plate.

In an exemplary embodiment with sleeve, the sleeve may comprise a cylindrical portion having a first end and a second end, a first frame portion at said first end and a second frame portion at said second end, said first frame portion being adhered to the first wall and said second frame portion being adhered to the second wall. The cylindrical portion, the first frame portion and the second frame portion may be manufactured as a single piece from the same material, e.g. a "plastic bag" material, optionally provided with an inner coating configured for promoting the detaching from solidified printing material.

In a preferred embodiment, the interior of the holder is sealed in a printing-material-tight manner. In a possible embodiment, the interior of the holder may be sealed from the atmosphere. In such an embodiment, a predetermined amount of gas may be provided in the holder. Alternatively, the holder may be provided with a venting mechanism.

In a further developed embodiment, the holder may be provided with an opening means for opening said holder. The opening means may be e.g. a tear line along which the holder may be torn open or a zip which can be opened and closed. In a possible embodiment, the opening means are configured for separating the holder in a first part comprising the second wall with printed object, and a second part in the form of a bag-like container (comprising the first wall and at least a portion of the sleeve) in which any remaining printing material is contained. The printed object can then be removed from the second wall, whilst the bag-like container can be disposed of.

According to a third aspect, the stereolithography printing apparatus comprises a support configured for supporting a holder containing a printing material; said holder having a first wall and an opposite second wall; a radiation unit configured to send radiation through said first wall in order to radiate and solidify printing material in said holder; a moving unit configured for moving said second wall of said holder with respect to said first wall of said holder. Preferably, the stereolithography printing apparatus further comprises a control unit configured for controlling said radiation unit and said moving unit such that a first layer and a plurality of consecutive layers is printed between said first wall and said second wall, wherein the first layer adheres to the second wall.

In a preferred embodiment, the stereolithography is intended for use with a holder comprising a first plate or frame in the first wall and a second plate or frame in the second wall, and the moving unit is configured for gripping said second wall such that the second plate or frame is in a position parallel to the first plate or frame, and for moving said second plate or frame up and down with respect to said first plate or frame.

In a preferred embodiment, the stereolithography is intended for use with a holder comprising a flexible sleeve between the first wall and the second wall, wherein said moving unit is configured for changing the shape of said flexible sleeve, such that a portion of the printing material is moved to or away from a zone in between the second wall and the first wall.

In a possible embodiment, the moving unit comprises one or more pushing members configured for pushing said sleeve when the second wall is moved away from the first wall. In that way, the flow speed of fresh liquid to a zone between the second wall and the first wall can be increased.

In a further developed embodiment, the stereolithography printing apparatus is intended to be used with a plurality of holders. The support may be configured for holding a plurality of holders containing printing material; each holder having a first wall and an opposite second wall. The radiation unit may be configured to send radiation through each first wall in order to radiate and solidify printing material in each holder of said plurality of holders. The radiating of the different holders may either be done simultaneously or according to a predetermined pattern. More in particular, the plurality of holders may be supported in said support with their first walls in the same plane, and the radiation unit which comprises a radiation source may be configured to move said radiation source in a plane parallel to the plane of the first walls of the plurality of holders. The moving unit may be configured for moving each second wall of each holder with respect to the corresponding first wall. This moving may be done synchronously if radiation of the plurality of holders takes place simultaneously, or may be performed in accordance with the predetermined radiation pattern.

In a preferred embodiment the stereolithography printing apparatus is intended to be used with a plurality of holders, preferably at least four holders. The support may be configured for holding a plurality of holders containing printing material; each holder having a first wall and an opposite second wall. The support is such that a user or an automated mechanism, such as robot arm, may place holders on the support as required in function of the arriving print jobs. There may be provided a number of moving units, wherein each moving unit is configured to move the second walls of a set of holders, e.g. a pair of holders simultaneously. The support may be configured e.g. for supporting the first walls of a plurality of pairs of holders, and there may be provided a moving unit for each pair, wherein the moving unit is preferably configured for moving the second walls of a pair vertically relative to the corresponding first walls. Preferably, the plurality of holders may be supported in said support with their first walls in the same plane. The radiation unit may be configured to send radiation through a first wall in order to radiate and solidify printing material in a holder. The radiating of the different holders may be performed according to a predetermined pattern. The radiation unit comprises a radiation source, a positioning means for positioning the radiation source and a controller for controlling the positioning of the radiation source. The positioning means may be configured to move the radiation source in a plane parallel to the plane of the first walls of the holders according to a pattern controlled by the controller. The pattern will depend typically on the number of print jobs. If there are a large number of print jobs, then a plurality of objects in a corresponding plurality of holders may be printed simultaneously, wherein the radiation source is moved, e.g. according to a "line per line" scanning pattern, to radiate to through each first wall of the plurality of holders. This step is repeated for each layer to be printed. To that end the controller may be configured to control the positioning means according to a "line per line" scanning pattern, such that the radiation source radiates subsequent lines of objects to be printed in the plurality of holders.

According to a fourth aspect, there is provided a stereolithography printing system comprising a stereolithography printing apparatus according to any one of the above disclosed embodiments, and a holder according to any one of the above disclosed embodiments.

According to a fifth aspect, there is provided a filling unit comprising: a determining module configured to determine an amount of printing material needed to print a plurality of successive layers to create one or more objects in a holder; and a filling module configured to fill the holder with said determined amount of printing material. Optionally, the filling unit may further comprise a gas filling module configured for filling the holder with a predetermined amount of gas. Optionally the determining by the determining module is based on a three dimensional computer model of the one or more objects to be printed during the same print job. Further, the determining module may be configured to determine a suitable amount of gas, in which case the gas filling module may be configured to fill the holder with this determined suitable amount of gas. In that way holders for 3D printing may be prepared with a suitable amount of printing material and/or gas.

According to another aspect of the invention, there is provided a method for stereolithography printing a first object in a first material and a second object in a second material, comprising the steps of: positioning a first holder containing a first printing material in a print position in the stereolithography printing apparatus; stereolithography printing of said first object in said first holder; moving said first holder away from said first position; opening said first holder and removing said printed first object from said opened first holder; positioning a second holder containing a second printing material in said print position; said second holder being different from said first holder; stereolithography printing of said second object in said second holder; moving said second holder away from said first position; opening said second holder and removing said printed second object from said opened second holder.

According to yet another aspect of the invention there is provided a method for stereolithography printing multiple objects, comprising the steps of: positioning a first holder containing a printing material and a second holder containing a printing material in a first and second print position in the stereolithography printing apparatus, respectively; stereolithography printing of a first object in said first holder and a second object in said second holder; moving said first and second holder away from said first and second position; and next opening said first and second holder and removing said printed first and second object from said opened first and second holder, respectively. Preferably, the moving away of first and second holder comprises moving the first and second holder outside of the stereolithography printing apparatus. The printing material in the first and second holder may be the same or different. Such a method will allow printing simultaneously in a plurality of holders that are positioned in the stereolithography printing apparatus. During printing the plurality of holders may be subjected to radiation simultaneously or subsequently, wherein a radiation unit moves from one holder to the next holder.

According to a further aspect of the invention there is provided a method for stereolithography printing, comprising the steps of: filling a cup with a printing material, said cup having a bottom with a first wall portion which allows radiation to pass through; closing said cup with a cover, said cover being coupled with a second wall portion which is moveable with respect to said first wall portion; advancing said second wall portion towards said first wall portion for creating a layer to be printed between said first wall portion and said second wall portion; printing said layer by sending radiation through said first wall portion; and moving said second wall portion away from the first wall portion whereby fresh printing material flows in between the first wall portion and the second wall portion; repeating said advancing, printing and moving steps so that one or more objects are formed on the second wall portion; removing said cover to remove the one or more objects from said second wall portion. It is noted that the moving (advancing) of the second wall portion with respect to the first wall portion may be performed by moving the second wall portion and/or by moving the cup.

In an exemplary embodiment thereof the second wall portion is fixed to an end of a guide rod, wherein the guide rod extends through a hole in the cover, and wherein the advancing and the moving steps are performed by moving the guide rod.

BRIEF DESCRIPTION OF THE FIGURES

The accompanying drawings are used to illustrate presently preferred non-limiting exemplary embodiments of devices of the present invention. The above and other advantages of the features and objects of the invention will become more apparent and the invention will be better understood from the following detailed description when read in conjunction with the accompanying drawings, in which.

DESCRIPTION OF EMBODIMENTS

Figure 1:
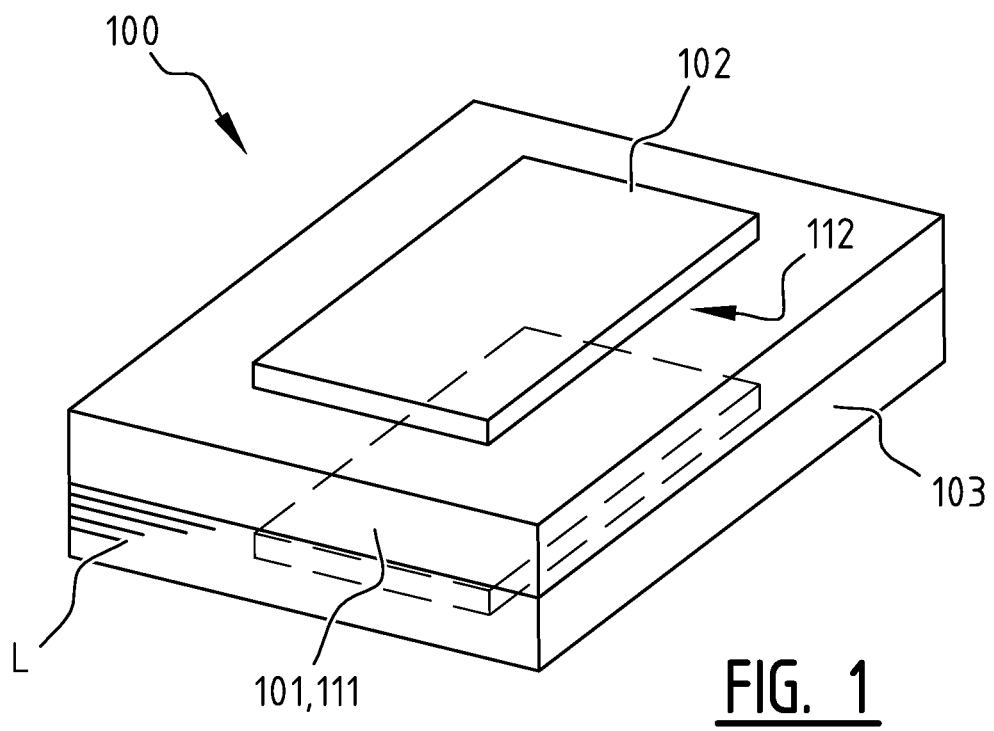
FIG. 1 illustrates schematically an embodiment of a holder according to the invention.

FIG. 1 illustrates schematically a first embodiment of a holder 100 containing a printing material L for use in stereolithography printing. The holder 100 has a first bottom wall 101, a second top wall 102 opposite said first wall 101, and a sleeve 103 extending between first wall 101 and second wall 102. The first wall 101 comprises a first portion 111 which is configured for allowing radiation to pass through. The second wall 102 has an internal surface portion 112 which is configured to adhere to the printing material upon solidification thereof. The sleeve 103 is configured for allowing said second wall 102 to be approached to said first wall 101 such that a layer of printing material can be printed between second wall 102 and first wall 101, see also FIGS. 2B and 2D which will be discussed below. Typically the distance d (see also FIG. 2B) between an inner surface of the second wall and an inner surface of the first wall, in the position in which the first layer is printed, is smaller than 0.5 mm, e.g. between 0.02 mm and 0.1 mm.

FIGS. 2A to 2E illustrate consecutive steps of an embodiment of a method for stereolithography printing. In a first step illustrated in FIG. 2A, a closed holder 100 containing a printing material is positioned in a first print position of a stereolithography apparatus. In the context of the present application "closed holder" means that the printing liquid cannot flow out of the holder during printing. In a second step illustrated in FIG. 2B, a second top wall 102 of the holder 100 is moved downward in the direction of a first bottom wall 101 of the holder, pushing printing material outwardly. The top wall 102 is brought at a distance d of the bottom wall 101 such that a first layer S with a thickness d may be printed by sending radiation through the first wall 101 for solidifying the first layer according to a printing pattern of the object to be formed. The second wall 102 comprises a modeling surface 112 which adheres well to the solidified layer, whilst the first wall 101 has an inner surface 121 which does not adhere to the solidified material S, such that the printed layer of solidified material S adheres to said modeling surface 112. Next, the second top wall 102 is moved upward to allow fresh printing material to flow inwardly in the area between the top wall 102 and the bottom wall 101, see FIG. 2C. In a fourth step, the top wall 102 is moved downward again until it is at a distance 2d from the bottom wall 101, and a second layer is printed. These steps are repeated until the entire object O is printed, see FIG. 2E. Now the holder 100 may be moved to a second position, preferably a second position outside the stereolithography apparatus, and the holder 100 may be opened to remove the object O. To open the holder 100, according to an exemplary embodiment, the sleeve 103 may be cut along a line C, see FIG. 2E. Alternatively, a separation line or a zip may be provided e.g. around second top wall 102. Many other alternatives are possible as will be immediately apparent to a person skilled in the art. The opened holder 100 with the remaining liquid L may now be disposed of or may be refilled.

In an exemplary embodiment, before printing, a holder 100 may be filled with a predetermined amount of printing material L, e.g. an amount that is more than an amount needed for printing one print job, e.g. the printing of a dental arch, but less than an amount needed for two print jobs, such that the remaining liquid in the holder after finishing the print job, here an object O, is small. In a further developed embodiment the amount of printing material L may be determined by a computer program, based on a 3D model of the one or more objects to be printed, and the holder may be filled, e.g. in a suitable filling unit which may be added to the stereolithography printing apparatus, with the determined amount.

Figure 2A:
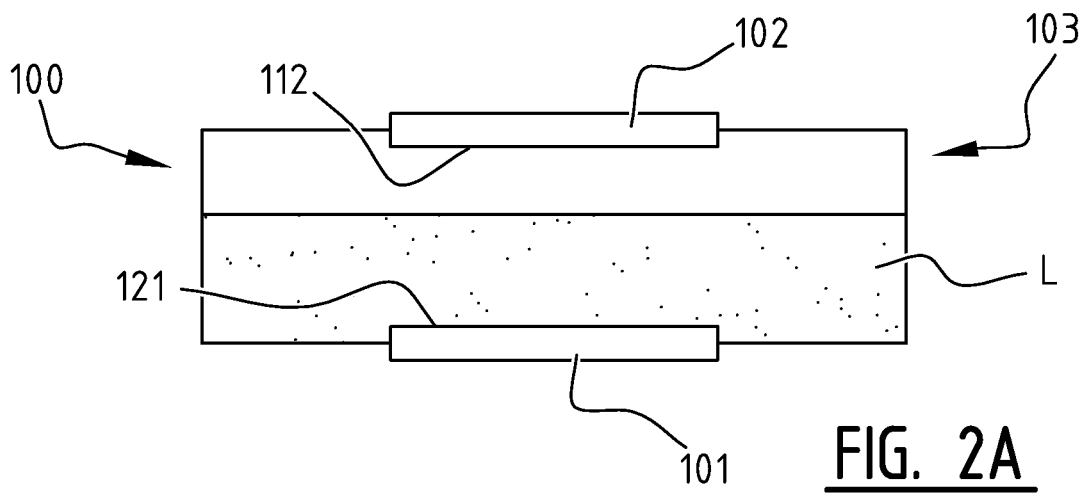
FIGS. 2A-2E illustrates schematically an embodiment of a stereolithography printing method according to the invention.
Figure 2B:
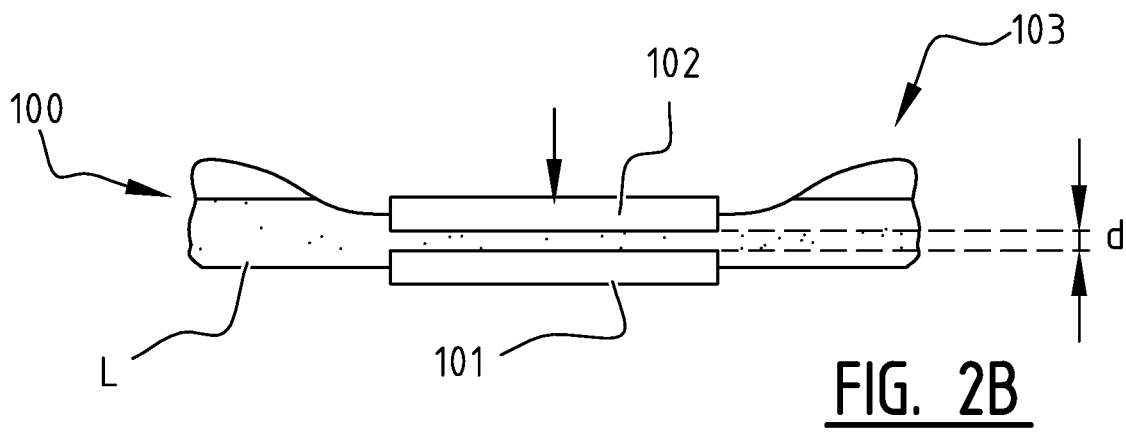
Figure 2C:
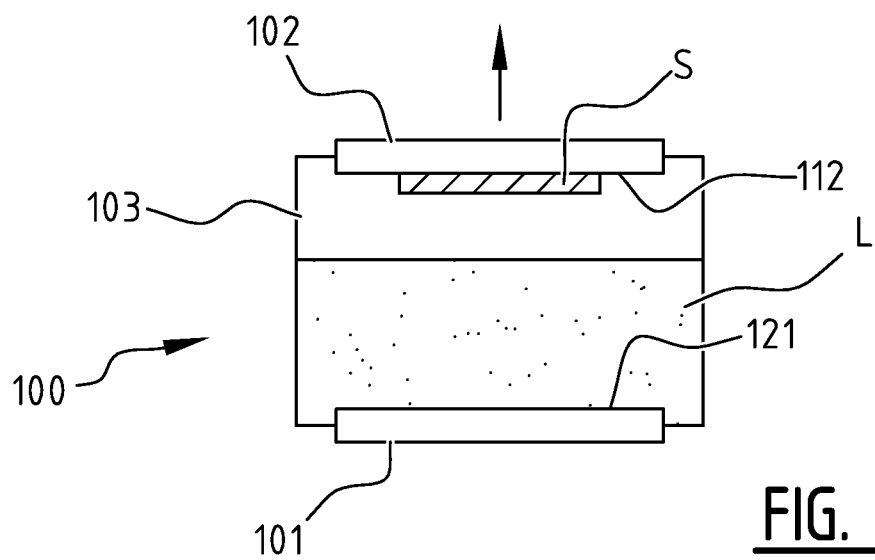
Figure 2D:
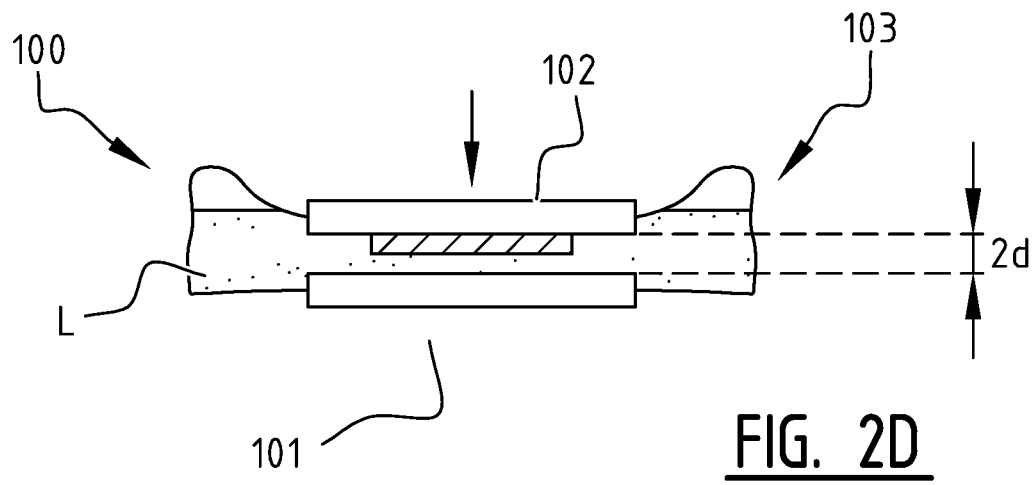
Figure 2E:
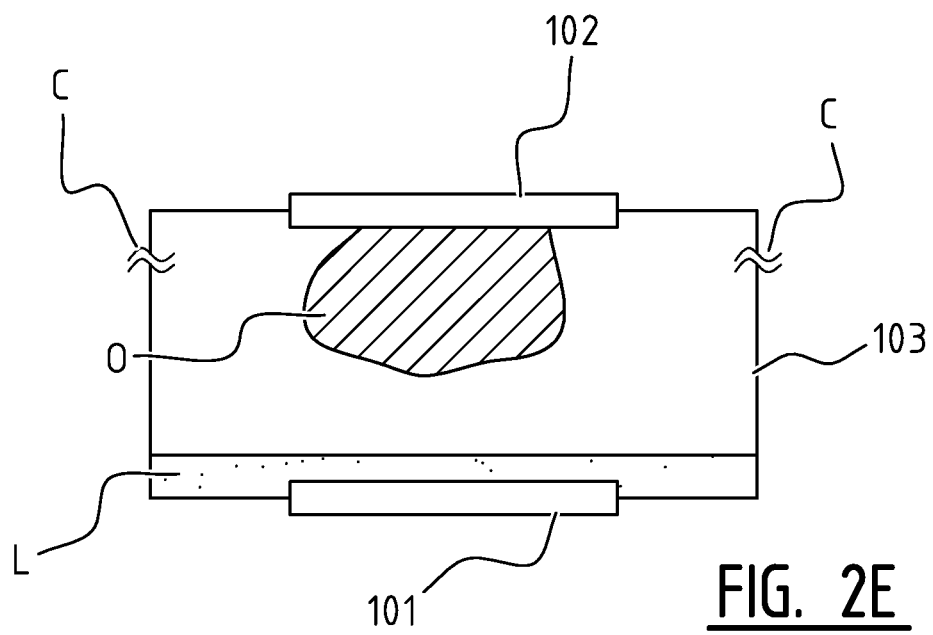

As is apparent from FIGS. 2B-2D, the shape of the sleeve of the closed holder 100 is changed for creating and printing a layer of printing material between opposite walls 101, 102 of the holder. More in particular the second and first wall 101, 102 are advanced towards each other for creating a layer to be printed between the first wall 101 and the second wall 102, whereupon said layer is printed, and the second wall 102 is moved away from the first wall 101 for allowing fresh printing material to flow between said first wall 101 and second wall 102. According to a variant, see also FIG. 9, the holder may comprise a house with a first wall having a first wall inner surface and a second wall having a second wall inner surface opposite said first wall inner surface, said second wall and/or said first wall being moveably arranged in said housing, such that said first wall can be advanced to and moved away from said second wall. In such an embodiment the shape of the sleeve is not changed, but the second and/or first wall is arranged moveably in a house. The skilled person understands that the embodiment of the method of FIGS. 2A to 2E can also be applied using such a variant of the holder.

FIGS. 3A to 3F illustrate six variants of the embodiment of FIG. 1. According to the first variant of FIG. 3A, the holder comprises a closed flexible bag 113 with an inner coating 123 on the bottom wall 101. The inner coating 123 may be a coating configured to detach solidified printing material, e.g. a silicone coating. A first transparent plate 111 is fixed to the bottom of the flexible bag 113 to form part of the bottom wall 101. A second plate 102 is fixed to the top of the flexible bag 113 to form part of the top wall 102. The flexible bag 113 may be made of a material that adheres well to the solidified printing material or may be provided at a top inner surface 112 with a coating which adheres well to solidified printing material.

Figure 3A:
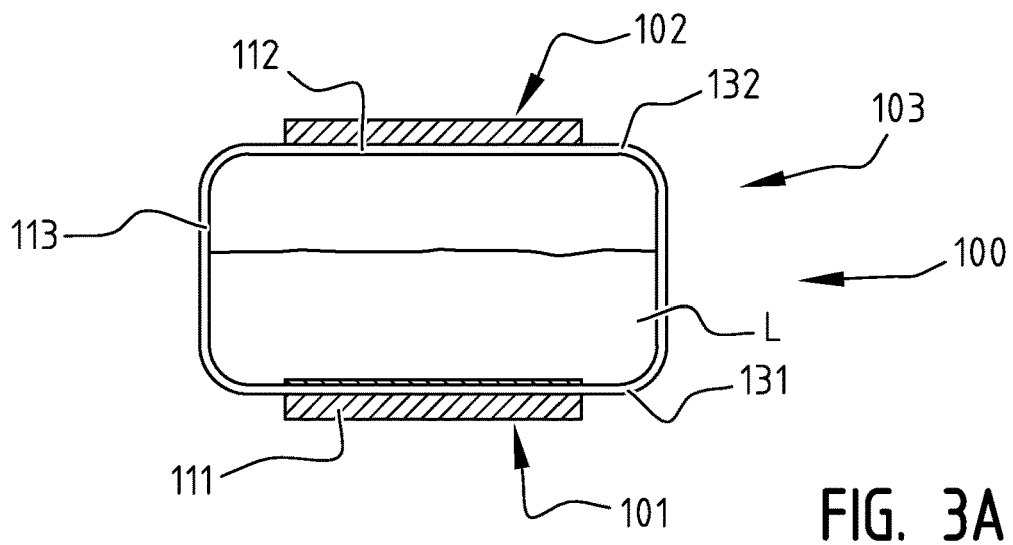
FIGS. 3A-3F illustrates schematically a section of six variants of the holder of FIG. 1.
Figure 3B:
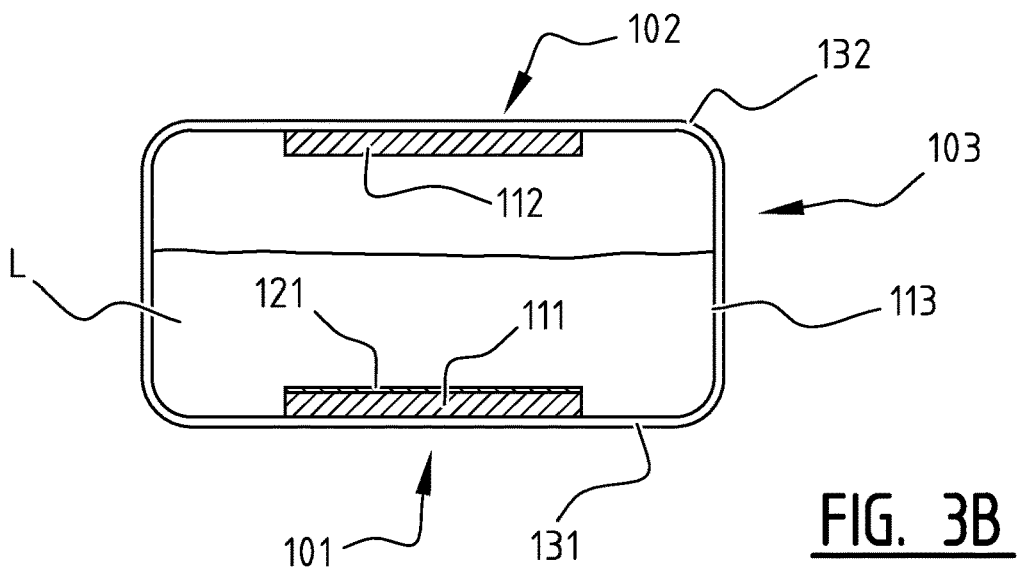

In the variant of FIG. 3B, the first transparent plate 111 and second plate 112 are attached to an inner surface of the flexible bag 113. A silicone coating 121 is applied on an inner surface of the first plate 111, and the second plate is made of a material that adheres well to solidified printing material.

Figure 3C:
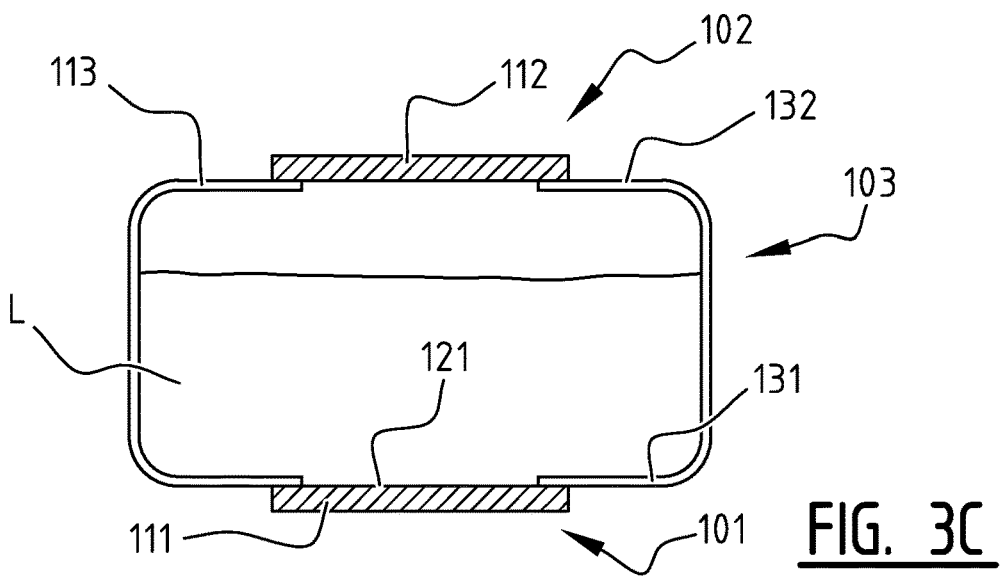

In the embodiment of FIG. 3C, only the sleeve 103 is formed as a flexible bag 113, and the flexible bag 113 is interrupted at the first wall 101 and at the second wall 102. A first plate 111 is adhered to the sleeve 103 at a bottom end thereof, and a second plate 112 is adhered to a top end of the sleeve 103. The first and second plate 111, 112 of the third variant may be similar to the first and second plate of the second variant.

In the variants of FIGS. 3A-3C, the sleeve 103 comprises a cylindrical portion (which may have a cross section which is square shaped, a rectangular, round, oval, etc.) having a first end and a second end, a first frame portion 131 at said first end and a second frame portion 132 at said second end, said first frame portion 131 being adhered to the first wall 101 and said second frame portion 132 being adhered to the second wall 102.

Figure 3D:
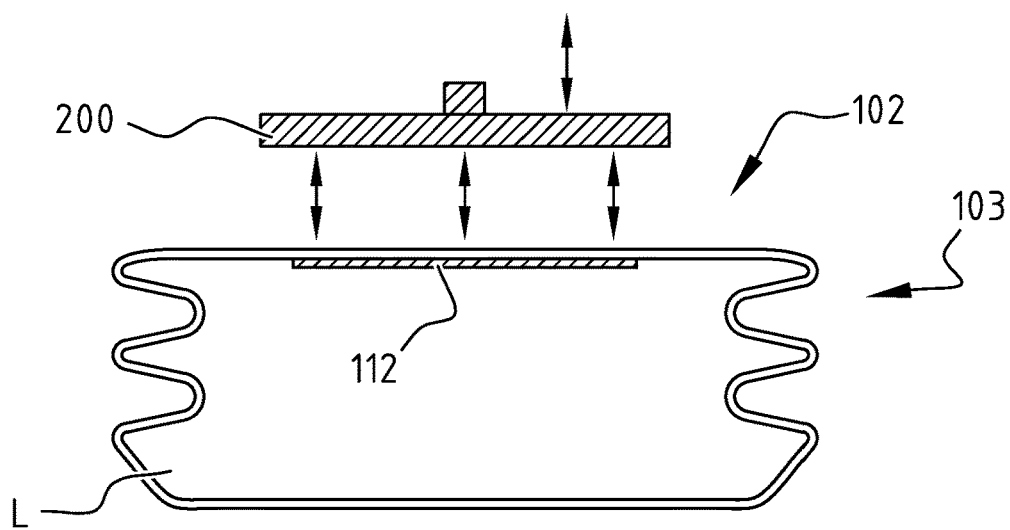

In the embodiment of FIG. 3D, the holder 100 is formed from a transparent plastic material. The sleeve 103 is formed with a compressible accordion-like side wall, such that the top wall 102 can be pressed downward in the direction of the bottom wall 101. The top wall 102 is provided with an inner coating 112, e.g. a metal coating which adheres well to solidified printing material. In such an embodiment, the bottom wall 101 may be fixed, e.g. using vacuum suction, to a transparent bottom plate of a stereolithography apparatus, and the top wall 102 may be fixed to a movable top plate of a stereolithography apparatus.

Figure 3E:
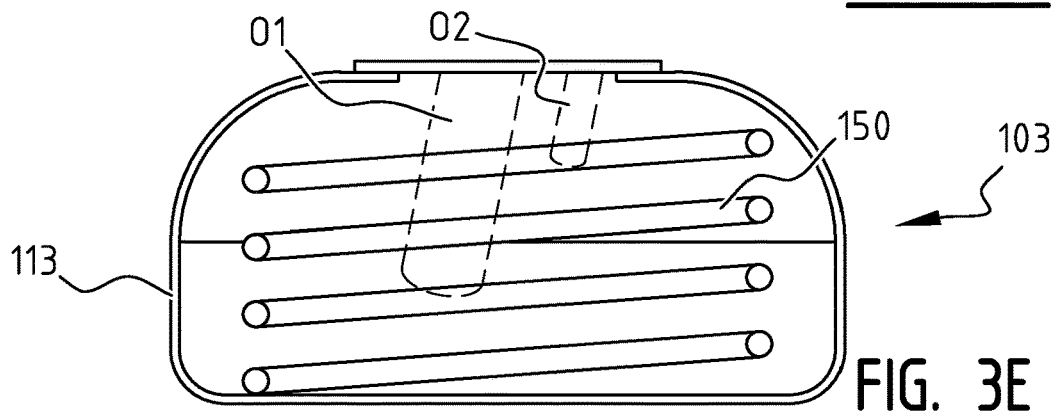

FIG. 3E illustrates a further variant where the first wall 101 and the sleeve 103 are made of a film material 113 and form a bag. The second wall 102 may be similar to the second wall of the variant of FIG. 3C. In this embodiment, the first wall 101 made of film material may be fixed onto a transparent support in the stereolithography apparatus, e.g. using vacuum suction. In such an embodiment, the transparent support (not shown) may be provided with small channels which are sucked vacuum to fix the film material against the support. Further, there may be provided a spring means 150 acting between the first wall 101 and the second wall 102, and configured, on the one hand, for allowing that said second wall 102 can be pressed against said first wall, whilst, on the other hand, maintaining said second wall 102 at a distance from said first wall 101 when the spring means 150 are not compressed. In that way, the one or more objects O1, O2 that are being formed will not be in the liquid at the end of a print job, and can be more easily removed from the holder. The film material 113 may a material that promotes detachment from solidified printing material. Alternatively, the film material 113 may be provided at an inner surface thereof with a suitable coating.

Figure 3F:
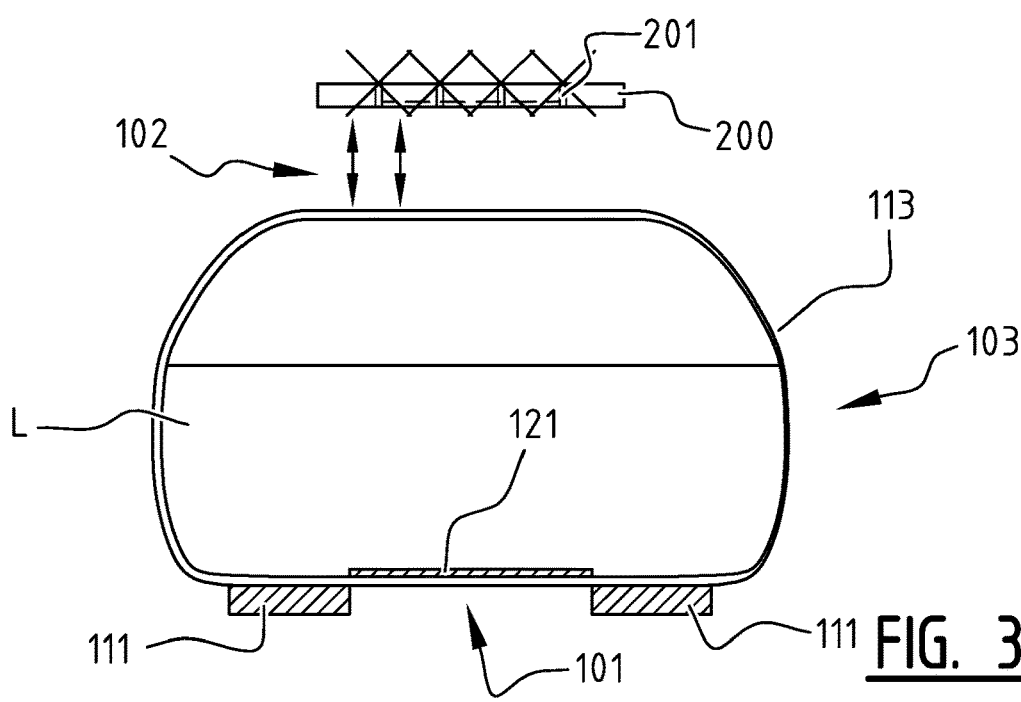

FIG. 3F illustrates a sixth variant which is similar to the variant of FIG. 3E, with this difference that a frame 111 is adhered to the bottom wall of the film material 113. In that way, the film material 113 may be stretched on the frame 111 to create a flat surface of the first wall 101. Optionally, this stretched surface may be provided with a suitable coating 121 for preventing that a solidified layer attaches to this surface. A further difference with the variant of FIG. 3E is that the second wall is also formed of a film material that can be gripped by a movable plate 200 of the stereo lithography apparatus for moving the second wall 102 to and away from the first wall 101. This gripping can be achieved through suction, e.g. by providing vacuum channels and grooves 201 in the movable plate 200, and connecting those channels 201 to a vacuum source. The film material 113 may be a single or multilayer transparent film material comprising e.g. an inner layer which adheres well to solidified printing material.

If a transparent material is used for the sleeve 103, in order to avoid curing of the printing material before printing (during storage), there may be provided an additional package around the holder. This additional package is configured to avoid that UV light can enter the holder during storage. This additional package may be removed, at least around the first wall when the holder is positioned for printing.

In the exemplary embodiments of FIGS. 3A to 3F, preferably at least the sleeve 103 is made of a flexible material that can be bent or folded as the second wall 102 is approached to the first wall 101. The sleeve 103 may be configured to be compressible in a direction perpendicular on the first wall 101. The sleeve 103 may be stretchable and/or deformable. In a possible embodiment, there may be provided spring means 150 in the holder 100 (see FIG. 3E and FIG. 5).

Preferably the printing material L is a liquid or a paste, for example, a liquid photocurable polymer which is solidifiable upon exposure to UV radiation or the like.

Figure 4A:
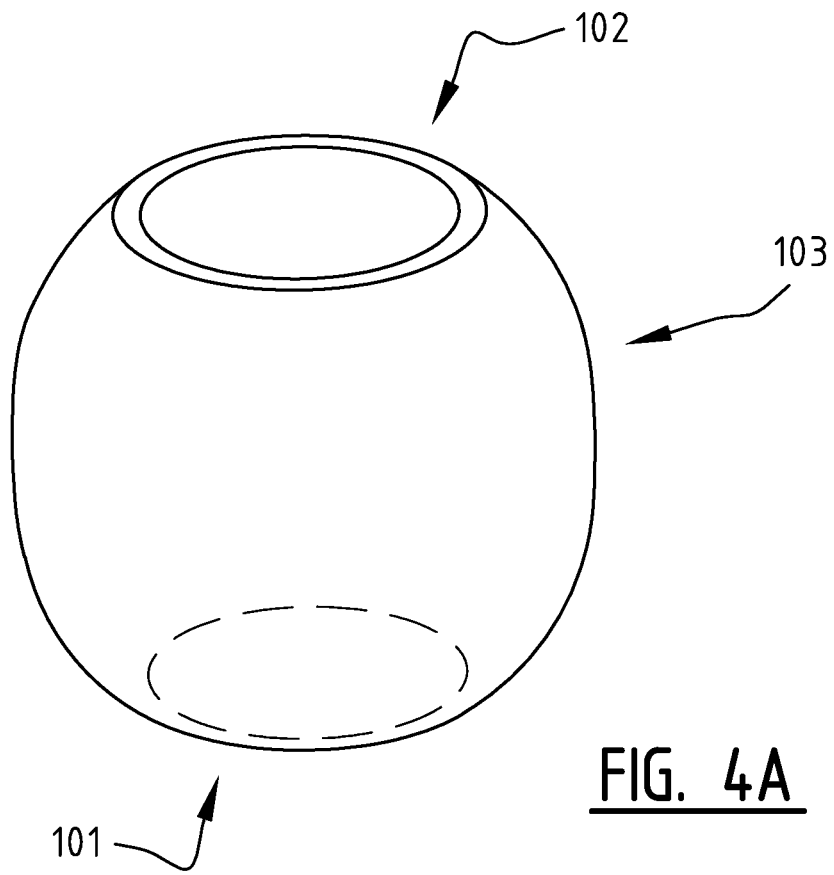
FIGS. 4A and 4B illustrates two further embodiments of a holder according to the invention.
Figure 4B:
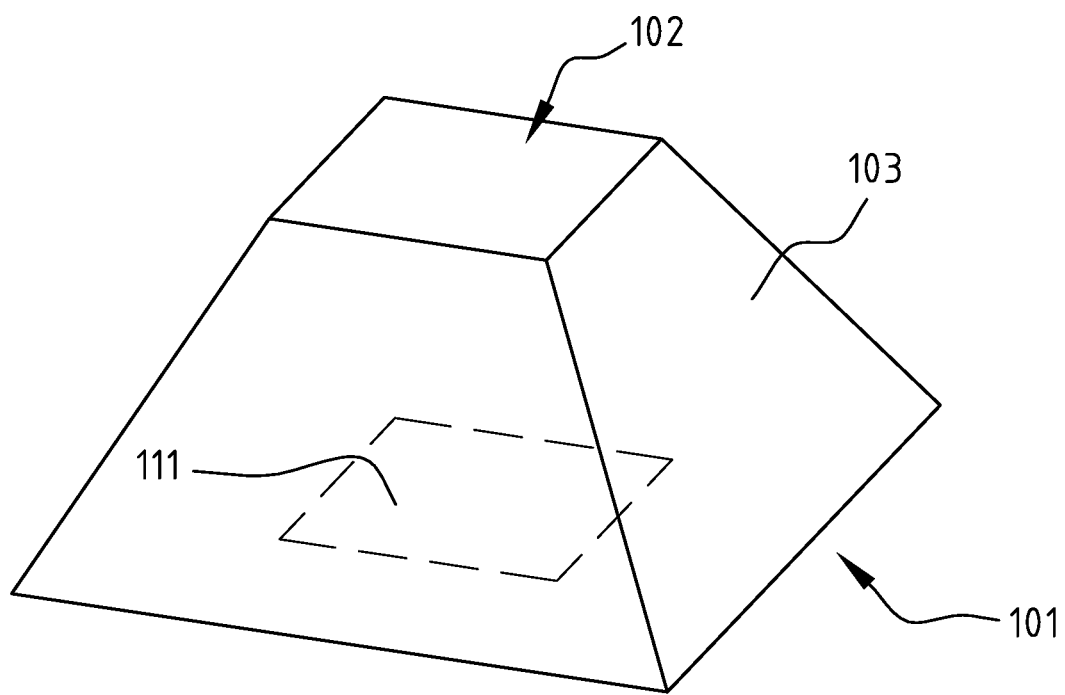

FIGS. 4A and 4B illustrate two further embodiments of a holder having a sleeve 103 with a round cross section and square cross section, respectively, with dimensions which vary between the first wall 101 and the second wall 102.

Figure 5:
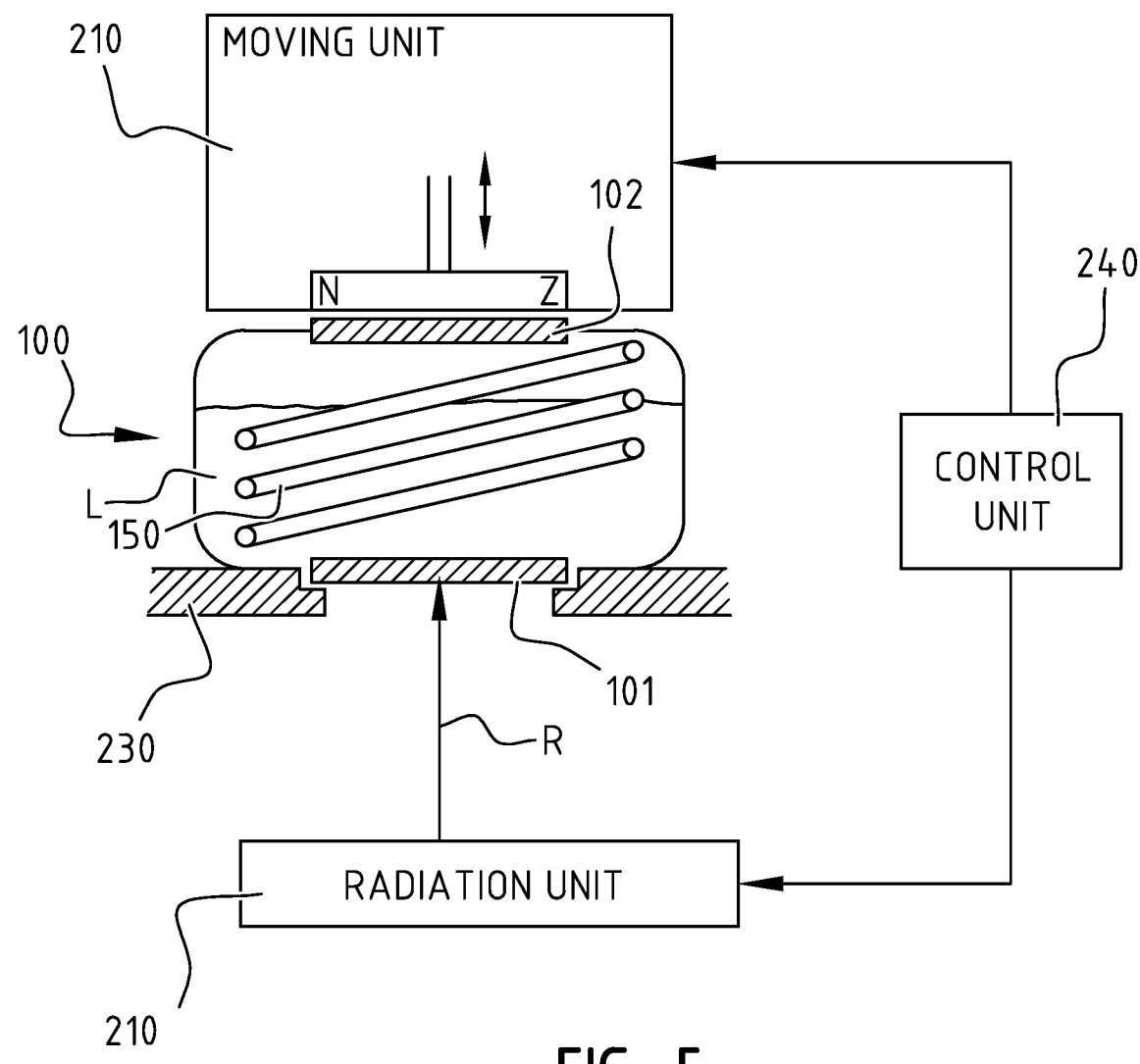
FIG. 5 illustrates schematically a first embodiment of a stereolithography printing apparatus of the invention.

FIG. 5 illustrates a first embodiment of a stereolithography printing apparatus comprising a support 230 configured for supporting a closed holder 100 containing a printing material; a radiation unit 220 configured to send radiation R through a first wall 101 of the holder 100 in order to radiate and solidify printing material in said holder 100; a moving unit 210 configured for moving a second wall 102 of said holder 100 with respect to the first wall 101 of said holder 100. In the illustrated embodiment the moving unit 210 moves the second wall 102, but the skilled person understand that instead of moving the second wall 102, the first wall 101 may be moved. According to yet another possibility both the first and the second walls 101, 102 may be moved. The moving unit 210 may comprise a magnet system for fixing the second wall to an elevator if the second wall comprises a metal plate. Alternatively, a vacuum suction system or a mechanical locking mechanism may be used for fixing the second wall to an elevator. The stereolithography printing apparatus further comprises a control unit 240 configured for controlling said radiation unit 220 and said moving unit 210 such that a first layer and a plurality of consecutive layers is printed between the first wall 101 and the second wall 102 of the holder 100, wherein the first layer adheres to the second wall 102. See also the embodiment of the method of FIGS. 2A-2D. More in particular, the control unit 240 may be configured to cause the radiation unit 220 and moving unit 210 to perform the method of FIGS. 2A-2D.

Figure 6:
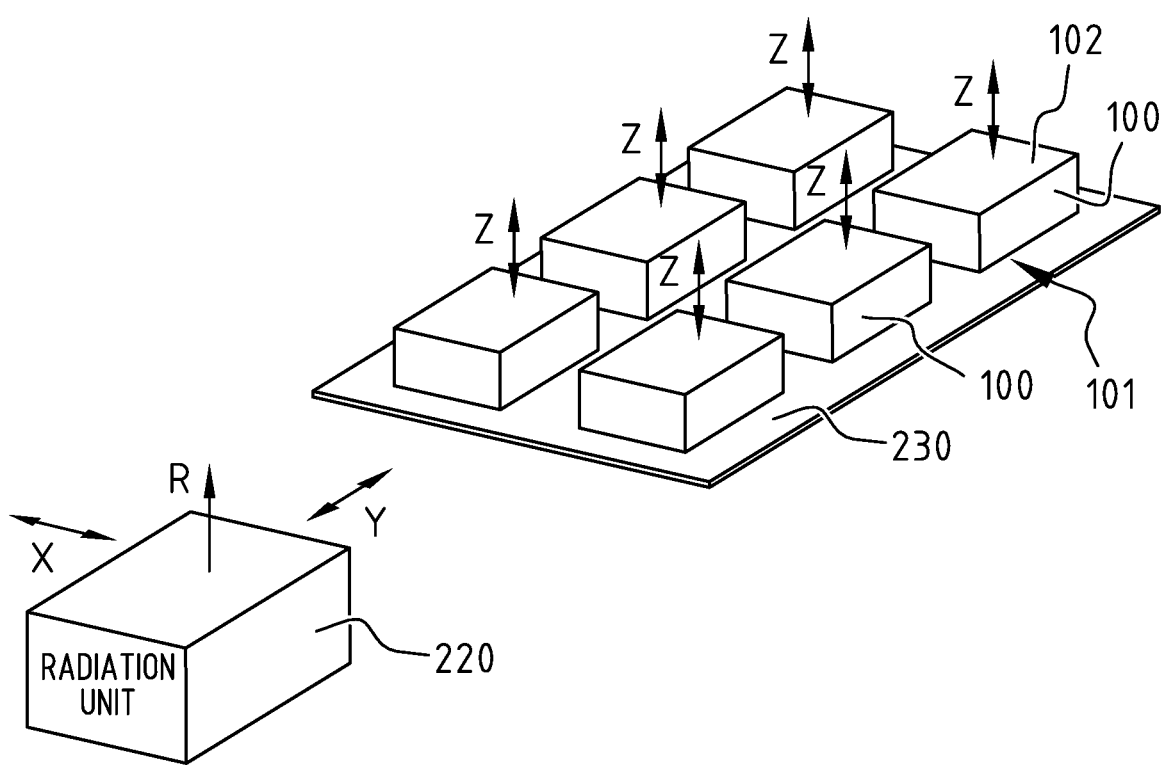
FIG. 6 illustrates schematically a second embodiment of a stereolithography printing apparatus of the invention.

FIG. 6 illustrates a second embodiment of a stereolithography printing apparatus. In this embodiment the support 230 is configured for holding a plurality of closed holders 100 containing printing material. The radiation unit 220 is configured to send radiation through each first wall in order to radiate and solidify printing material in each holder 100 of said plurality of holders. To that end, the radiation unit 220 may be moveably mounted such that the radiation unit 220 can be moved in an X and Y direction, in a plane parallel to the plane of the first walls 101 of the plurality of holders 100. Instead of moving the radiation unit 220, the support 230 could be moved. A moving unit (not shown) is configured for moving each second wall 102 of each closed holder 100 with respect to the corresponding first wall in a Z-direction. The moving unit may be similar to the moving unit 210 described with reference to FIG. 5 but adapted to move a plurality of second walls 102.

Figure 7:
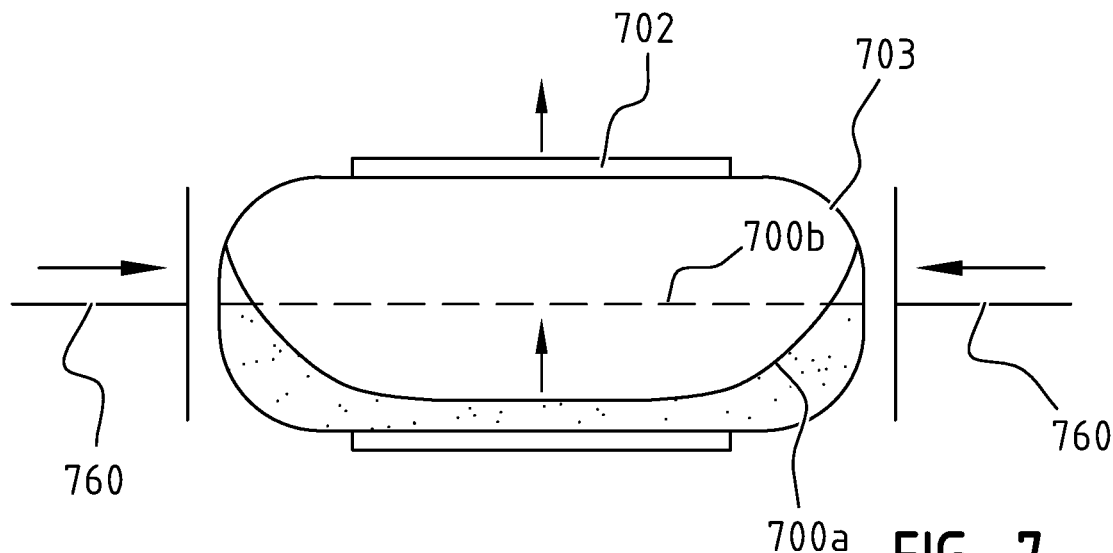
FIG. 7 illustrates a further embodiment of a stereolithography printing method according to the invention.

FIG. 7 illustrates a further embodiment of the method on the invention. In this embodiment there are provided pusher members 760 which are arranged to push against the sleeve 703, such that fresh material can be moved faster between the first wall 701 and the second wall 702 when the second wall 702 is moved away from the first wall 701. In other words, the movement of the printing liquid from a position 700*a* to a position 700*b* can be faster, resulting in an increased speed of the printing process.

Figure 8:
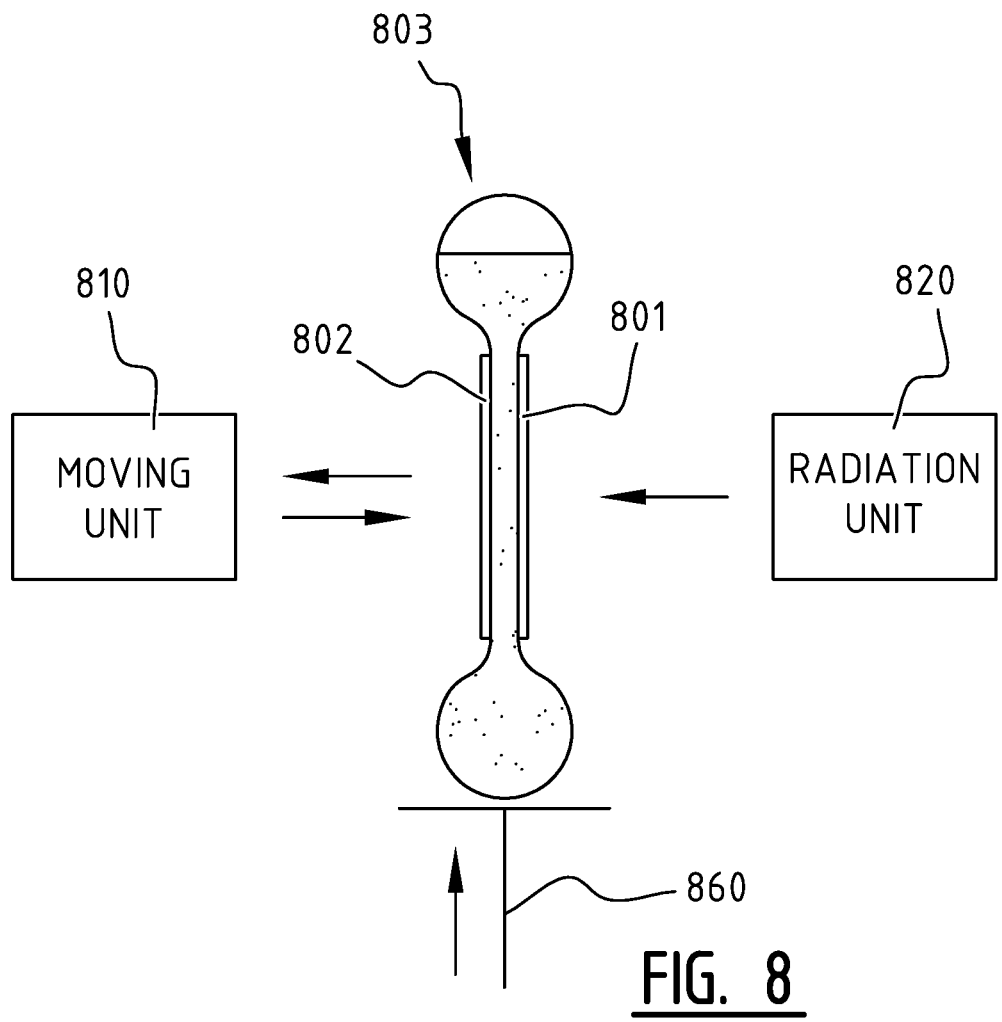
FIG. 8 illustrates schematically a third embodiment of a stereolithography printing apparatus of the invention.

FIG. 8 illustrates a further variant of a stereolithography apparatus of the invention. In this embodiment the first wall 801 and the second wall 802 are oriented vertically, and the moving unit 810 is configured for moving the second wall 802 laterally to and away from the first wall 801. Also the radiation can be performed in a lateral direction using a radiation unit 820. Further, there may be provided a pushing member 860 for pushing against a side of the sleeve 803 for pushing the printing liquid inwardly when fresh liquid is needed between the first wall 801 and the second wall 802. The skilled person understands that the first and second wall may be oriented in an arbitrary manner as long as the second wall can be moved to and away from the first wall. Also, instead of, or in addition to, moving the second wall, the first wall may be moved.

Figure 9:
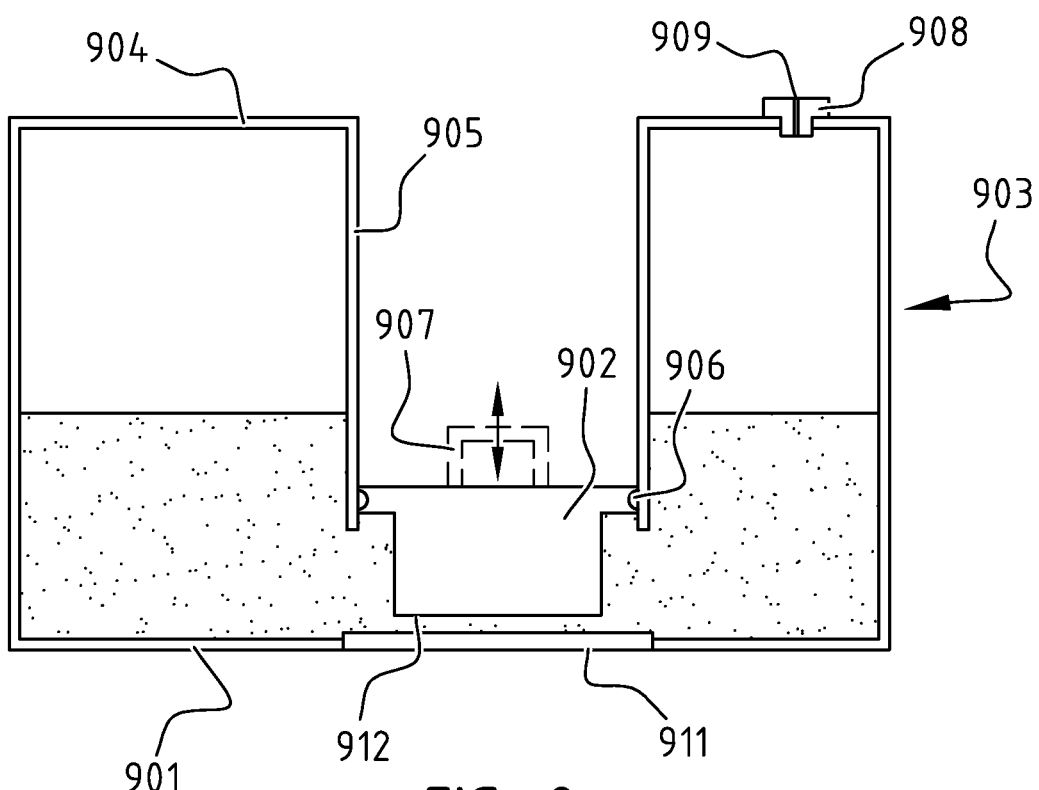
FIGS. 9 and 10 illustrate schematically two further exemplary embodiments of a holder according to the invention.

FIG. 9 illustrates schematically a further exemplary embodiment of a holder according to the invention. In this embodiment the holder 900 comprises a housing 903 comprising a first wall 901 comprising a transparent plate 911 and a second wall 902 opposite said first wall 901. The second wall 902 may be made of metal or may comprise a layer at its inner surface 912 which adheres well to solidified printing material. The second wall 902 is moveably arranged in the housing 903, such that said first wall 901 can be advanced to and moved away from said second wall 902. To that end, the housing comprises a wall 904 with a channel 905 directed towards an interior of the housing 903, said channel 905 being arranged for guiding said second wall 902. Instead or in addition to arranging the second wall 902 in a movable manner, also the first wall 901 may be arranged in a moveable manner. The second wall 902 may be arranged in a liquid-tight manner in the channel 905, using e.g. an O-ring 906. The skilled person understand that other mechanical guiding means for the second wall 902 and other shapes of the housing 903 are possible. The second wall 902 may be provided with a manipulation part 907 protruding outwardly from said second wall 902 to facilitate the manipulation of the second wall 902. Further, there may be provided an opening in the housing 903 for mounting a stop 909 with a venting channel 908, such that the interior of the holder 900 is vented, and such that air can escape/enter when the second wall 902 is moved downwards/upwards.

Figure 10:
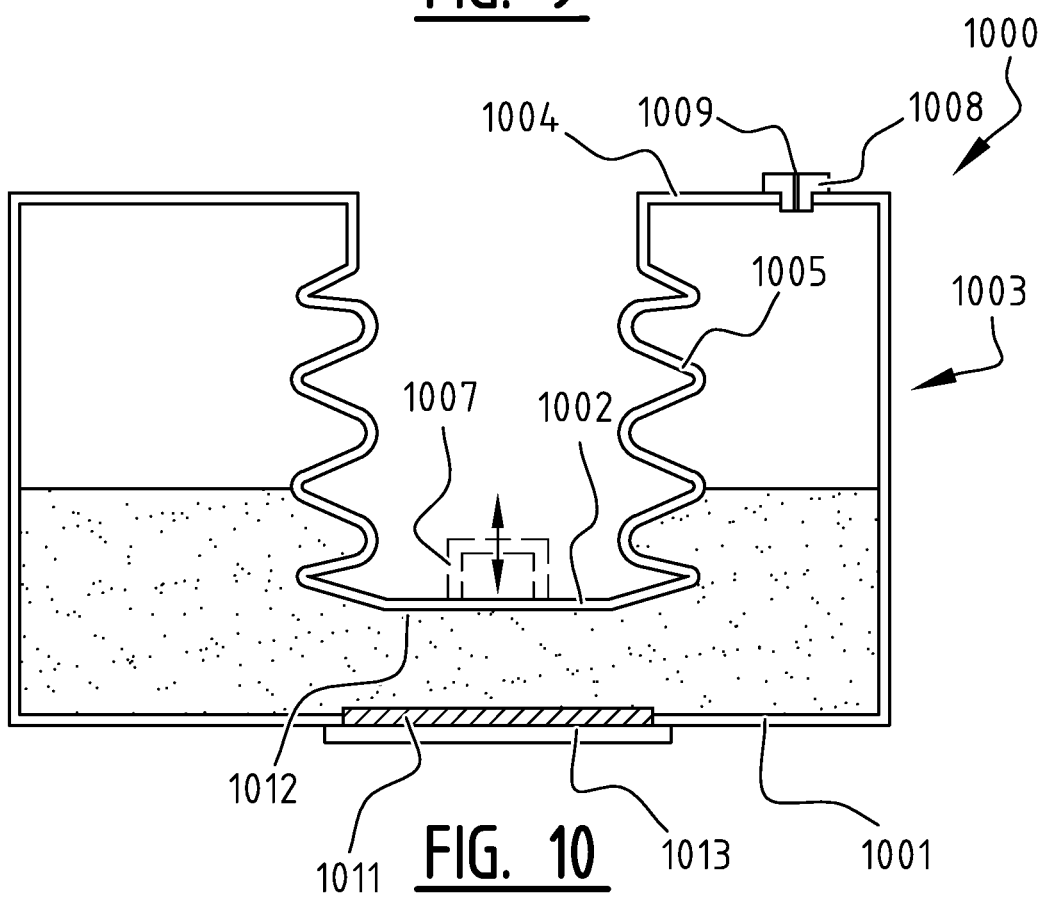

FIG. 10 illustrates schematically another exemplary embodiment of a holder according to the invention. In this embodiment the holder 1000 comprises a housing 1003 comprising a first wall 1001 with a transparent plate 911 and a second wall 1002 opposite said first wall 1001. The second wall 1002 may be made of metal or may comprise a layer at its inner surface 1012 which adheres well to solidified printing material. The second wall 1002 is moveably arranged in the housing 1003, such that said first wall 1001 can be advanced to and moved away from said second wall 1002. To that end the housing comprises a wall 1004 with a compressible and/or stretchable and/or flexible sleeve 1005 directed towards an interior of the housing 1003, said second wall 1002 being attached to a bottom end of said sleeve 1005. Instead or in addition to arranging the second wall 1002 in a movable manner, also the first wall 1001 may be arranged in a moveable manner. The second wall 1002 may be provided with a manipulation part 1007 protruding outwardly from said second wall 1002 to facilitate the manipulation of the second wall 1002. Further, there may be provided an opening in the housing 1003 for mounting a stop 1009 with a venting channel 1008, such that the interior of the holder 1000 is vented, and such that air can escape/enter when the second wall 1002 is moved downwards/upwards. Also, there may be provided a non-transparent removable foil 1013 over the first wall 1001 in order to avoid curing during storage of the holder, which foil 1013 may be removed when the holder is placed in the stereolithography printing apparatus.

Figure 11A:
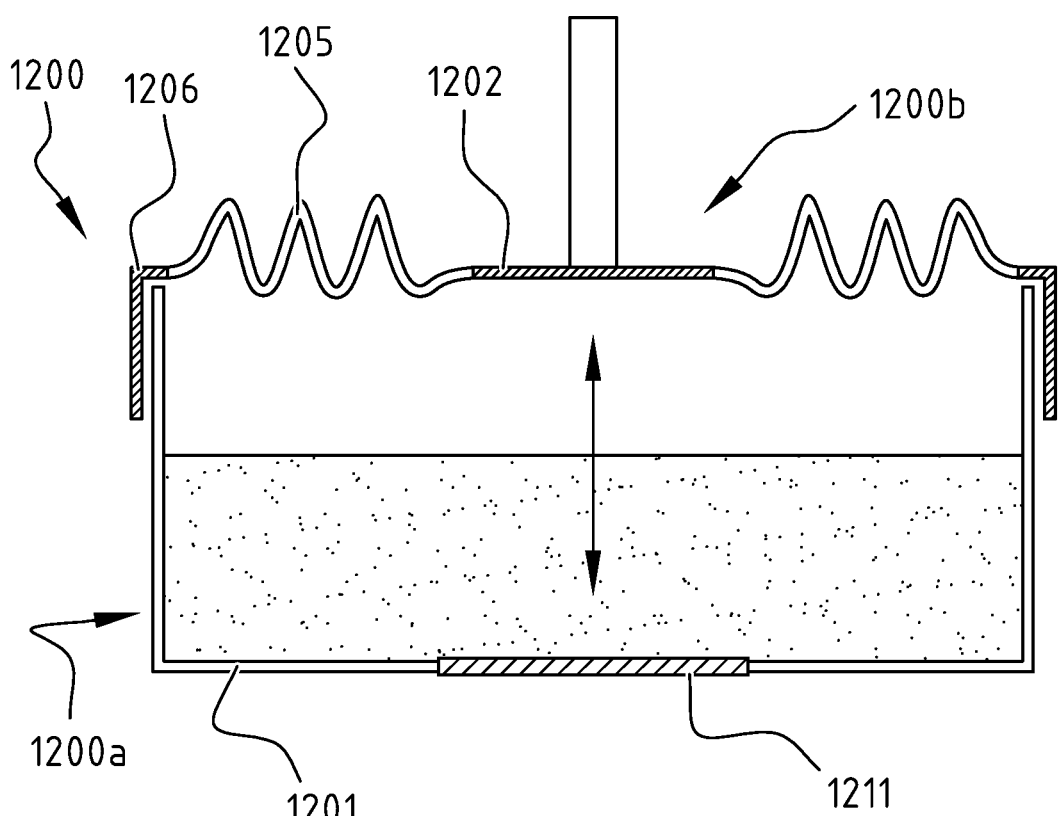
FIGS. 11A and 11B illustrate schematically another exemplary embodiment of a holder with cover.
Figure 11B:
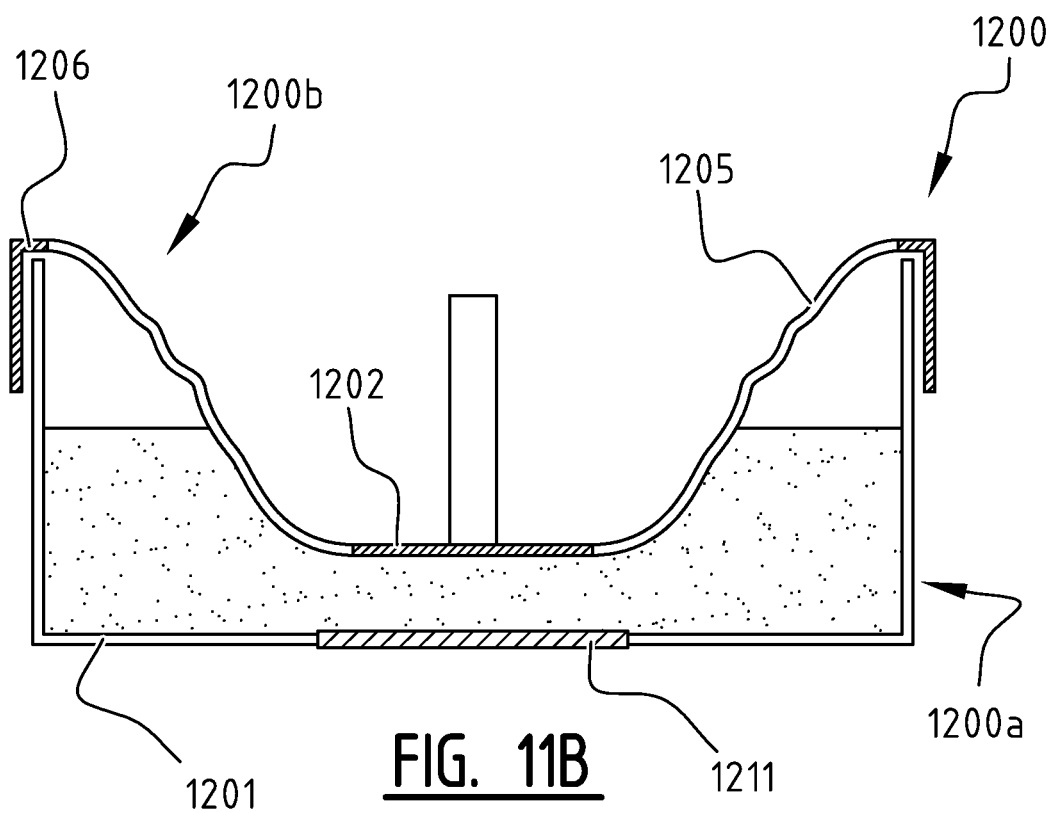

FIGS. 11A and 11B illustrate schematically another exemplary embodiment of a holder 1200 with cover 1200*b*. The holder 1200 comprises a cup 1200*a* with an open top end, and a cover 1200*b* for closing the open top end of the cup 1200*a*. The cup 1200*a* comprises a first wall 1201 comprising a transparent plate 1211. A second wall 1202 is integrated in the cover 1200*b*, and is connected through a flexible portion 1205 with an edge 1206 of the cover 1200*b*. The second wall 1202 located opposite the first wall 1201 is moveable towards and away from the first wall 1201. The second wall 1202 may be made of metal or may comprise a layer at its inner surface which adheres well to solidified printing material. The cover 1200*b* may be arranged in a liquid-tight manner on the cup 1200*a*, using e.g. an O-ring (not shown). The skilled person understands that other mechanical guiding means for the second wall 1202 and other shapes of the cup 1200*a* and for the cover 1200*a* are possible. Further, there may be provided an opening in the cover 1200*b* for mounting a vent (not shown), such that the interior of the holder 1200 is vented. The cup 1200*a* and/or the cover 1200*b* may be disposable or reusable. Further, the cover 1200*b* may be mounted in the printing apparatus or may be removed after each use. In certain embodiments the cup 1200*a* with cover 1200*b* may be removed from the printing apparatus after printing. In other embodiments, after printing, the holder 1200 may be first opened automatically in the printing apparatus, whereupon the cup 1200*a* is removed from the printing apparatus without the cover 1200*b*, and the one or more printed objects may then be removed from the second wall 1102.

Figure 12:
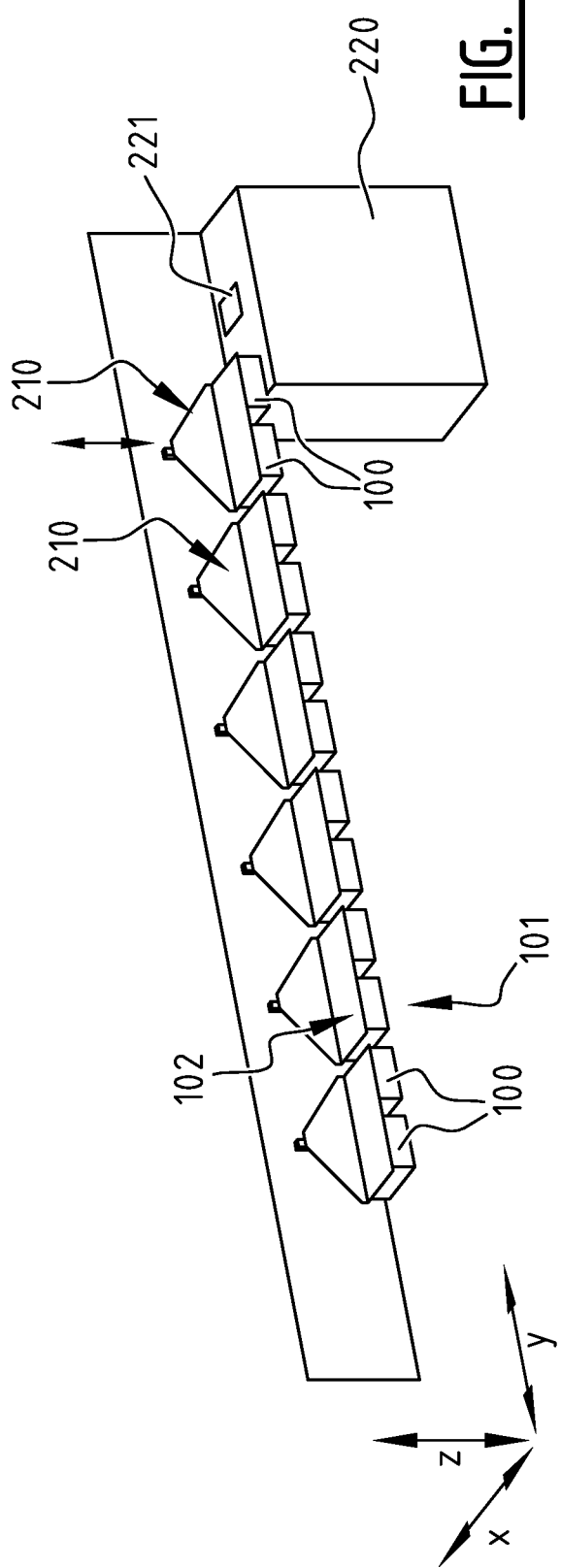
FIG. 12 illustrates schematically another exemplary embodiment of a printing apparatus.
Figure 13:
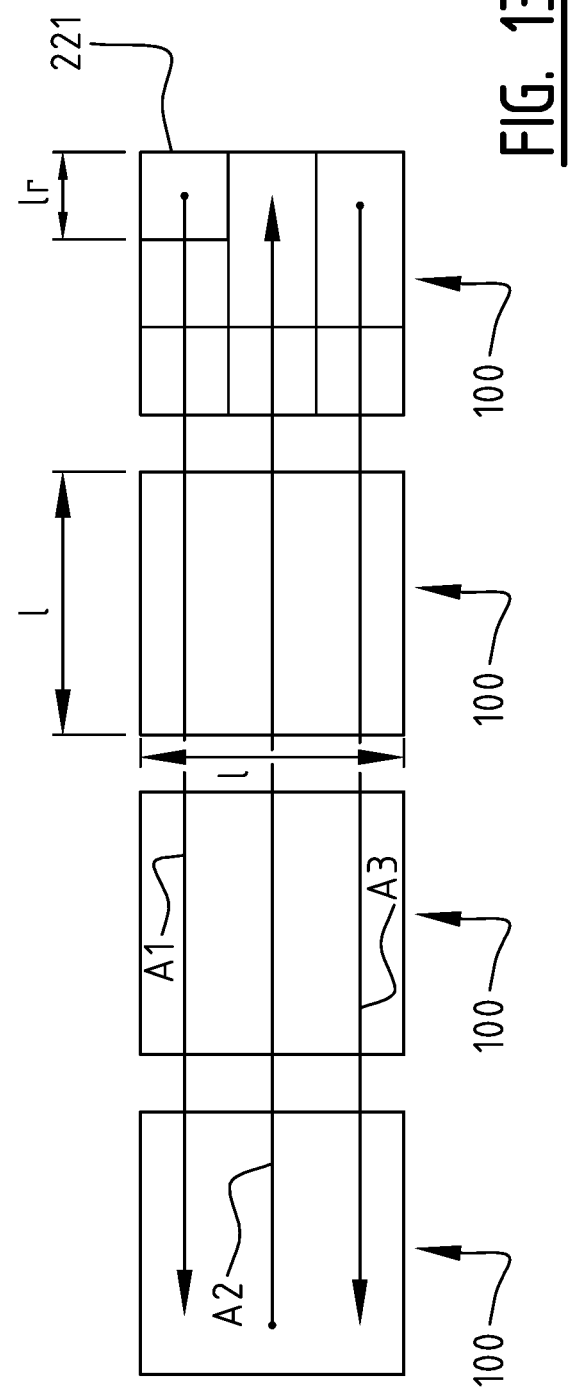
FIG. 13 illustrates an exemplary movement pattern of the radiation source of the embodiment of FIG. 12.

FIG. 12 illustrates another exemplary embodiment of a stereolithography printing apparatus. The printing apparatus comprises a support 230 configured for supporting a plurality of holders 100 each containing a printing material; a radiation unit 220 configured to send radiation R through a first wall 101 of the holders 100 in order to radiate and solidify printing material in said holder 100; a plurality of moving units 210 configured for moving a second wall 102 of the holders 100 with respect to the first wall 101 thereof. In the illustrated embodiment the apparatus is designed for receiving a maximum of six pairs of holders 100, but the skilled person understands that the apparatus may be designed for receiving more or less holders 100. The support 230 is such that a user or an automated mechanism, such as robot arm, may place holders 100 on the support 230 as required in function of the arriving print jobs. There is provided one moving unit 210 for each pair, wherein the moving unit 210 is configured for moving the second walls 102 of each pair vertically along the Z-axis relative to the first walls 101 which are supported on the support 230. The plurality of holders 100 is supported on the support 230 with their first walls 101 in the same plane.

The radiation unit 220 may be configured to send radiation through a first wall in order to radiate and solidify printing material in a holder. The radiating of different holders 100 may be performed according to a predetermined pattern as will be further elucidated referring to FIG. 14. The radiation unit 220 comprises a radiation source (not visible) with a corresponding radiation area 221 (see also FIG. 14), a positioning means for positioning the radiation source and a controller for controlling the positioning of the radiation source. The positioning means is configured to move the radiation source in a plane parallel to the plane of the first walls of the holders, i.e. in the X-Y plane, according to a pattern controlled by the controller. The radiation source is moveably mounted such that it can be moved in an X and Y direction by the positioning means. Instead of moving the radiation source, the support 230 could be moved. The movement pattern of the radiation area 221 will depend typically on the number of print jobs. If there are a large number of print jobs, then a plurality of objects in a corresponding plurality of holders 100 may be printed in the same print run, wherein the radiation source is moved, e.g. according to a "line per line" scanning pattern, to radiate to through each first wall of the plurality of holders. This step is repeated for each layer to be printed. A possible pattern is illustrated in FIG. 14. The holders 100 may have a square base with a length l, e.g. l=100 mm. The skilled person understands that other shapes and dimensions of the holders are equally possible and will depend on the type of objects to be printed. The radiation area 221 has a square shape with a length lr, e.g. lr=34 mm. According to an exemplary embodiment objects in four adjacent holders may be printed in the same run, wherein the radiation source is moved first from right to left, see arrow A1, then from left to right, see arrow A2, and next again from right to left, see arrow A3, whereupon the radiation source can be brought back into its start position. This will result in a four printed first layers adhering to the second walls 102 of the four adjacent holders 100. Then the movement units 210 move the second walls 102 of the four holders 100 away from the first walls 101 over a distance corresponding with the thickness of the printed layer, whereupon the next layers are printed using the same pattern. The skilled person will understand that many other patterns are possible and that more or less than four holders may be printed in the same run.

The apparatus of FIG. 12 will allow an operator to prepare next print jobs, i.e. to put the required filled holders for the next print jobs in the machine, whilst previous print jobs are being performed. E.g. the machine may be printing objects in four holders, while an operator prepares the next four holders.

Whilst the principles of the invention have been set out above in connection with specific embodiments, it is to be understood that this description is merely made by way of example and not as a limitation of the scope of protection which is determined by the appended claims. In the exemplary embodiments of the figure the first wall is a bottom wall and the second wall a top wall. However, the skilled person understand that the first wall may be a top wall and the second wall a bottom wall, in which case radiation is from above instead of from below.

The invention claimed is:

1. A method for stereolithography printing, comprising the steps of:
    positioning a holder containing a printing material in a first position in a stereolithography apparatus, wherein the holder is a closed holder;
    wherein the holder has a first wall having a first wall inner surface, a second wall having a second wall inner surface opposite said first wall inner surface, and a sleeve extending between said first wall and said second wall,
    stereolithography printing a plurality of successive layers in said closed holder using radiation for solidifying the printing material, such that one or more objects are formed;
    moving said closed holder with said one or more formed objects from said first position to a second position away from said first position;
    opening said closed holder and removing said one or more formed objects from said opened holder, in said second position of the holder,
    wherein the holder is configured for allowing said first wall inner surface and said second wall inner surface of the holder to be moved towards each other and away from each other, and wherein stereolithography printing the plurality of successive layers comprises:
        advancing said second wall inner surface and first wall inner surface towards each other for creating a layer to be printed between said first wall inner surface and said second wall inner surface;
        printing said layer; and
        moving said second wall inner surface away from the first wall inner surface whereby fresh printing material flows in between the first wall inner surface and the second wall inner surface,
    wherein, during said advancing and during said moving away, a shape of the sleeve changes.

2. The method of claim 1, wherein during said advancing and during said moving away, the shape of the holder is changed for creating a fresh layer of printing material between the first wall inner surface and the second wall inner surface of the holder.

3. The method of claim 1, wherein the holder comprises a housing, wherein the housing comprises with the first wall having the first wall inner surface and the second wall having the second wall inner surface opposite said first wall inner surface, at least one of said second wall and said first wall being moveably arranged in said housing, such that said first wall can be advanced to and moved away from said second wall, wherein stereolithography printing the plurality of successive layers comprises:
    advancing said second wall and first wall towards each other for creating said layer to be printed between said first wall and said second wall;
    printing said layer; and
    moving said second wall away from the first wall whereby fresh printing material flows in between the first wall and the second wall.

4. The method of claim 1, wherein the second position is outside of the stereolithography apparatus.

5. The method of claim 1, wherein the holder is disposed of after the opening of the holder.

6. The method of claim 1, wherein the holder comprises a window, and wherein the stereolithography printing comprises sending radiation through said window to solidify a layer of printing material adjacent said window.

7. The method of claim 1, wherein the holder comprises a modeling surface, and wherein during the stereolithography printing a layer of solidified material adheres to said modeling surface.

8. The method of claim 1, further comprising, before positioning the holder in the stereolithography apparatus:
    determining an amount of printing material needed to print the plurality of successive layers to create said one or more formed objects in the holder;
    filling the holder with said determined amount of printing material; and
    closing the holder.

9. The method of claim 8, further comprising, before closing the holder:
    filling said holder with a predetermined amount of gas.

10. The method of claim 1, wherein said one or more formed objects comprise any one of the following: a tooth, a plurality of teeth, a lower or upper dental arch, a removable die, or a bridge.

11. A method for stereolithography printing, comprising the steps of:
- positioning a holder containing a printing material in a first position in a stereolithography apparatus;
- stereolithography printing a plurality of successive layers in said holder using radiation for solidifying the printing material, such that one or more objects are formed;
- moving said holder with said one or more formed objects from said first position to a second position away from said first position; and
- opening said holder and removing said one or more formed objects from said opened holder, in said second position of the holder,
- wherein the holder is configured for allowing a first wall inner surface and a second wall inner surface of the holder to be moved towards each other and away from each other,
- wherein the holder has a first wall having the first wall inner surface, a second wall having the second wall inner surface opposite said first wall inner surface, and a sleeve extending between said first wall and said second wall and,
- wherein stereolithography printing the plurality of successive layers comprises:
  - advancing said second wall inner surface and first wall inner surface towards each other for creating a layer to be printed between said first wall inner surface and said second wall inner surface;
  - printing said layer; and
  - moving said second wall inner surface away from the first wall inner surface whereby fresh printing material flows in between the first wall inner surface and the second wall inner surface,
- wherein, during said advancing and during said moving away, a shape of the sleeve changes.

12. The method of claim 11, wherein during said advancing and during said moving away, the shape of the holder is changed for creating a fresh layer of printing material between the first wall inner surface and the second wall inner surface of the holder.

13. The method of claim 11, wherein the second position is outside of the stereolithography apparatus.

14. The method of claim 11, wherein the holder is disposed of after the opening of the holder.

15. The method of claim 11, further comprising, before positioning the holder in the stereolithography apparatus:
- determining an amount of printing material needed to print the plurality of successive layers to create said one or more formed objects in the holder;
- filling the holder with said determined amount of printing material; and
- closing the holder.

* * * * *